(12) United States Patent
Maede et al.

(10) Patent No.: US 9,455,630 B2
(45) Date of Patent: Sep. 27, 2016

(54) CONTROL CIRCUIT AND CONTROL METHOD OF DIGITAL CONTROL POWER SUPPLY CIRCUIT, AND DIGITAL CONTROL POWER SUPPLY CIRCUIT, ELECTRONIC DEVICE AND BASE STATION USING THE SAME

(71) Applicant: ROHM CO., LTD., Ukyo-ku, Kyoto (JP)

(72) Inventors: Jun Maede, Kyoto (JP); Shigenobu Shimohagi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 8 days.

(21) Appl. No.: 14/665,492

(22) Filed: Mar. 23, 2015

(65) Prior Publication Data

US 2015/0280590 A1 Oct. 1, 2015

(30) Foreign Application Priority Data

Mar. 25, 2014 (JP) ................. 2014-062324

(51) Int. Cl.
*H02M 3/335* (2006.01)
*H02M 3/157* (2006.01)
*H02M 3/158* (2006.01)
*H02M 1/00* (2006.01)

(52) U.S. Cl.
CPC ......... *H02M 3/157* (2013.01); *H02M 3/33515* (2013.01); *H02M 3/33569* (2013.01); *H02M 3/1588* (2013.01); *H02M 2001/0025* (2013.01); *Y02B 70/1466* (2013.01)

(58) Field of Classification Search
CPC ............................. H02M 3/335486
See application file for complete search history.

(56) References Cited

U.S. PATENT DOCUMENTS 8,604,766 B2* 12/2013 Shiraishi ................. G05F 1/468
323/283

FOREIGN PATENT DOCUMENTS

JP 2003284322 A 10/2003

* cited by examiner

*Primary Examiner* — Emily P Pham
(74) *Attorney, Agent, or Firm* — Cantor Colburn LLP (57) ABSTRACT

A control circuit of digital control power supply circuit includes: first filter generating detection voltage having voltage level based on time average of output voltage of the digital control power supply circuit; A/D converter sampling feedback voltage having voltage level based on the output voltage at peak or bottom of the output voltage and converting the sampled feedback voltage into digital feedback data, and converting the detection voltage into digital detection data; error detector generating error data indicating difference between the feedback data and target data indicating target value of the feedback voltage; compensator generating duty command value adjusted to make the error data approximate zero; digital pulse modulator receiving the duty command value and generating pulse signal having duty ratio corresponding to the duty command value; and correction unit correcting the target data based on difference between the detection data and the feedback data.

10 Claims, 9 Drawing Sheets

CONTROL CIRCUIT AND CONTROL METHOD OF DIGITAL CONTROL POWER SUPPLY CIRCUIT, AND DIGITAL CONTROL POWER SUPPLY CIRCUIT, ELECTRONIC DEVICE AND BASE STATION USING THE SAME

CROSS-REFERENCE TO RELATED APPLICATION

The present invention claims priority under 35 U.S.C. §119 to Japanese Application No. 2014-062324 filed Mar. 25, 2014, the entire content of which is incorporated herein by reference.

TECHNICAL FIELD

The present disclosure relates to a digital control power supply circuit.

BACKGROUND

In order to generate a voltage higher or lower than a given input voltage, a power supply circuit such as a DC/DC converter (switching regulator) or the like is used. Such a power supply circuit includes an analog control type power supply circuit and a digital control type power supply circuit. In the analog control type power supply circuit, an error between an output voltage of the power supply circuit and a target value thereof is amplified by an error amplifier and a switching duty ratio is controlled based on an output from the error amplifier, thus stabilizing the output voltage with a target value. In the digital control type power supply circuit, an output voltage of the power supply circuit is converted into a digital value by an A/D converter, and a duty ratio of a switching transistor is controlled by digital signal processing.

The digital control type power supply circuit (which is also referred to as a digital control power supply circuit, hereinafter, simply as a power supply circuit) is less restricted in a control algorithm, having a high degree of freedom in design and also having an advantage in that a control scheme may be altered by software. Further, in a long-term operation, the history of various data may be maintained as digital values.

Figure 1:
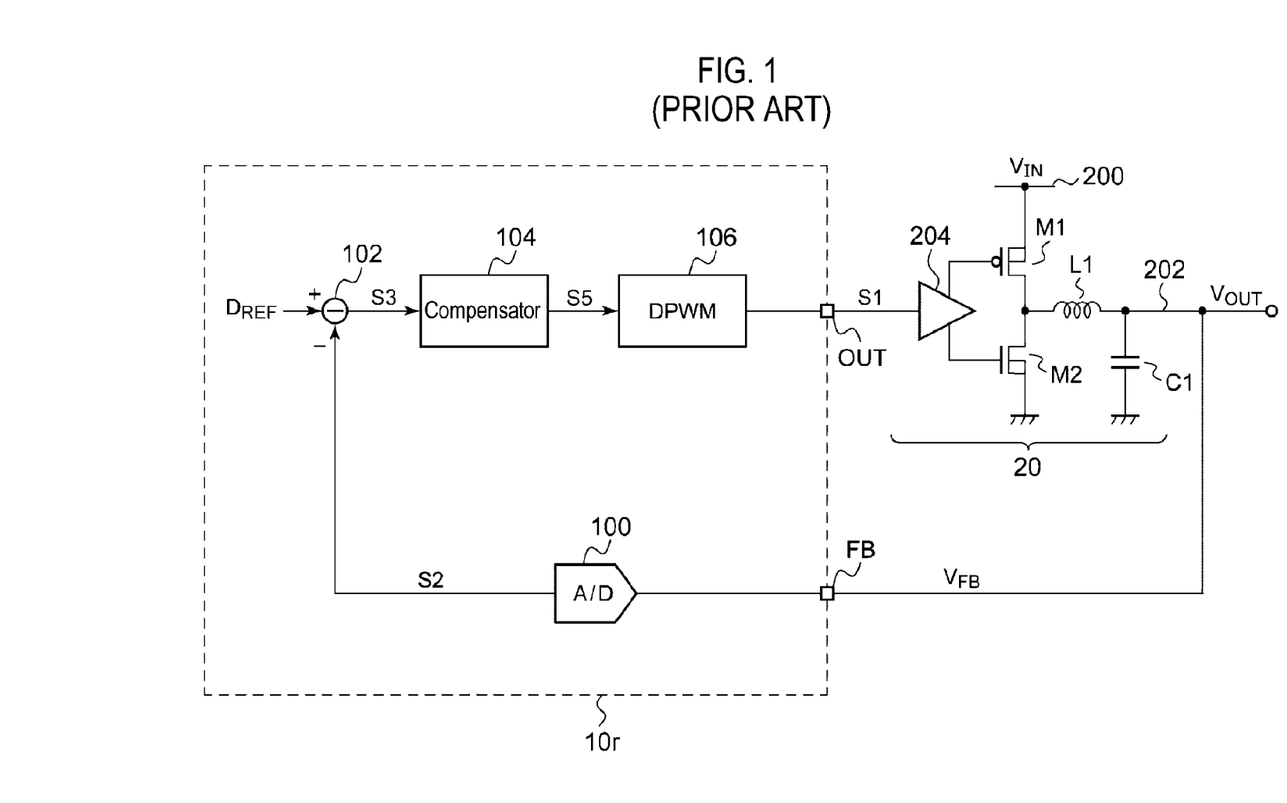
FIG. 1 is a block diagram illustrating the configuration of a digital control power supply circuit reviewed by the present inventors.

FIG. 1 is a block diagram illustrating a configuration of a digital control power supply circuit (simply referred to as a power supply circuit) reviewed by the inventors of the present disclosure.

A power supply circuit 2r includes a control circuit 10r and an output circuit 20. The power supply circuit 2r receives an input voltage $V_{IN}$ from an input line 200, steps the input voltage $V_{IN}$ down, and supplies an output voltage $V_{OUT}$ to a load (not shown) connected to an output line 202.

The output circuit 20 includes a driver 204, a switching transistor M1, a synchronous rectification transistor M2, an inductor L1, and an output capacitor C1. In FIG. 1, an output circuit of a step-down (buck) DC/DC converter is illustrated. The driver 204 switches the switching transistor M1 and the synchronous rectification transistor M2 depending on a pulse signal S1 output from an output terminal OUT of the control circuit 10r.

A feedback voltage $V_{FB}$ that corresponds to the output voltage $V_{OUT}$ is input to a feedback terminal FB of the control circuit 10r. The control circuit 10r includes an A/D converter 100, an error detector 102, a compensator 104, and a digital pulse modulator 106. The A/D converter 100 converts the feedback voltage $V_{FB}$ into digital feedback data S2. The error detector 102 calculates error data S3 indicating a difference between the feedback data S2 and a target value $D_{REF}$. The compensator 104 performs PID control or the like to generate a duty command value S5 which is adjusted to make the error data S3 close to zero. The digital pulse modulator 106 receives the duty command value S5 and generates a pulse signal S1 having a corresponding duty ratio.

The present inventors have reviewed the power supply circuit 2r of FIG. 1 and recognized the following tasks.

Figure 2:
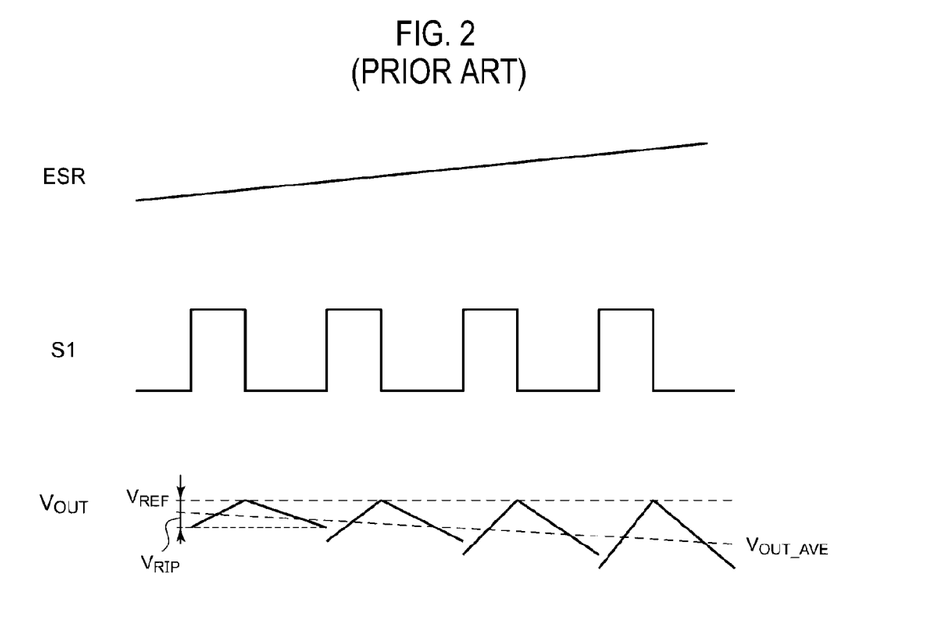
FIG. 2 is an operational waveform diagram of the power supply circuit of FIG. 1.

FIG. 2 is an operational waveform diagram of the power supply circuit 2r of FIG. 1. A case in which the A/D converter 100 samples the output voltage $V_{OUT}$ one time at every switching period is considered. Here, it is assumed that the output voltage $V_{OUT}$ is sampled at a timing when the switching transistor M1 is turned off. In this case, the output voltage $V_{OUT}$ is sampled at a peak of the ripple, and is fed-back. The duty ratio D is adjusted such that the peak value of the output voltage $V_{OUT}$ approximates a target value $V_{REF}$. Supplied to the load is an average level $V_{OUT\_AVE}$ of the output voltage VOUT, which is given by Eq. (1):

$$V_{OUT\_AVE} = V_{REF} - V_{RIP}/2 \qquad \text{Eq. (1)}$$

That is, the average level $V_{OUT\_AVE}$ of the output voltage $V_{OUT}$ decreases with the increase of the ripple $V_{RIP}$.

Here, a component resulting from a voltage drop of equivalent series resistance (ESR) of the output capacitor C1 is noted as a ripple $V_{RIP}$ of the output voltage $V_{OUT}$. The ripple $V_{RIP}$ at this time is expressed by Eq. (2) shown below:

$$V_{RIP} = ESR \times V_{OUT} \times (1-D)/(L \cdot f_{SW}) \qquad \text{Eq. (2)}$$

wherein D is a switching duty ratio, $f_{SW}$ is a switching frequency, and L is an inductance of the inductor L1.

When an electrolytic condenser is used as the output capacitor C1, the ESR thereof increases over time due to aging of the electrolytic condenser. Also, when a temperature is lowered, the ESR of the output capacitor C1 increases. Thus, when the ESR increases in the power supply circuit 2r of FIG. 1, the ripple $V_{RIP}$ increases and an average level $V_{OUT\_AVE}$ of the output voltage $V_{OUT}$ is reduced.

The present disclosure provides some embodiments of a digital control power supply circuit capable of improving stability of an output voltage $V_{OUT}$, and a control circuit thereof.

SUMMARY

According to one aspect of the present disclosure, there is provided a control circuit of a digital control power supply circuit. The control circuit includes an A/D converter configured to sample a feedback voltage having a voltage level based on an output voltage of the digital control power supply circuit at a peak or a bottom of the output voltage and convert the same into digital feedback data; an error detector configured to generate error data indicating a difference between the feedback data and target data indicating a target value of the feedback voltage; a compensator configured to generate a duty command value adjusted to make the error data approximately zero; a digital pulse modulator configured to receive the duty command value and generate a pulse signal having a duty ratio corresponding to the duty command value; and a correction unit configured to correct the target data based on an amplitude of a ripple voltage of the output voltage obtained from the feedback voltage.

The feedback data indicates a peak level (or bottom level) of the output voltage $V_{OUT}$. The power supply circuit is feedback controlled such that the peak level (bottom level) becomes equal to a reference voltage. By correcting target data indicating the reference voltage based on a ripple voltage of the output voltage, an average level of the output voltage can be constantly maintained.

More specifically, the control circuit according to an aspect of the present disclosure includes a first filter configured to generate a detection voltage having a voltage level based on a time average of an output voltage of the digital control power supply circuit; an A/D converter configured to (i) sample a feedback voltage having a voltage level based on the output voltage of the digital control power supply circuit at a peak or a bottom of the output voltage and convert the sampled feedback voltage into digital feedback data, and (ii) convert the detection voltage into digital detection data; an error detector configured to generate error data indicating a difference between the feedback data and target data indicating a target value of the feedback voltage; a compensator configured to generate a duty command value adjusted to make the error data approximately zero; a digital pulse modulator configured to receive the duty command value and generate a pulse signal having a duty ratio corresponding to the duty command value; and a correction unit configured to correct the target data based on a difference between the detection data and the feedback data.

The detection data indicates an average level of the output voltage $V_{OUT}$ and the feedback data indicates a peak or bottom level of the output voltage $V_{OUT}$. Accordingly, the difference between the detection data and the feedback data indicates ½ of the ripple amplitude. Thus, the average level of the output voltage can be constantly maintained by correcting the target voltage based on the difference between the detection data and the feedback data.

The correction unit may include a differential data generating unit configured to generate difference data indicating the difference between the detection data and the feedback data; and an adder configured to add the difference data to a set value of the target data.

The correction unit may further include a second filter configured to calculate a time average of the feedback data; and a third filter configured to calculate a time average of the detection data.

The A/D converter may update the detection data at a period longer than that of the pulse signal.

The compensator may perform a proportional, integral and derivative (PID) control.

The control circuit may be integrally integrated on a single semiconductor substrate.

"Integrally Integrated" may include a case in which all components of the circuit are formed on a semiconductor substrate, and may also include a case in which major components of the circuit are integrally integrated and some resistors, capacitors, or the like for circuit constant adjustment are installed outside of the semiconductor substrate.

According to another aspect of the present disclosure, there is provided a digital control power supply circuit. The digital control power supply circuit may include an output circuit including at least one switching transistor, an inductive element, and an output line that generates a DC output voltage based on a switching operation of the switching transistor; and the aforementioned control circuit that controls the switching transistor based on the output voltage. The inductive element may include an inductor or a transformer.

According to still another aspect of the present disclosure, there is provided an electronic device. The electronic device includes the aforementioned digital control power supply circuit.

According to still another aspect of the present disclosure, there is provided a base station for mobile communication. The base station includes the aforementioned digital control power supply circuit.

Further, arbitrary combinations of the foregoing components and substitution of the components and expressions of the present disclosure among a method, an apparatus, a system, and the like may also be effective as an aspect of the present disclosure.

DETAILED DESCRIPTION

Hereinafter, the present disclosure will be described based on embodiments with reference to the drawings. Like or equivalent components, members, and processes illustrated in each drawing are given like reference numerals and a repeated description thereof will be properly omitted. Also, the embodiments are merely illustrative, without limiting the present disclosure, and any feature or combination thereof described in the embodiments may not necessarily be essential to the present disclosure.

In the present disclosure, "a state in which a member A is connected to a member B" includes a case in which the member A and the member B are physically directly connected or even a case in which the member A and the member B are indirectly connected through any other member that does not affect an electrical connection state therebetween. Further, "a state in which a member C is installed between a member A and a member B" also includes a case in which the member A and the member C or the member B and the member C are indirectly connected through any other member that does not affect the electrical connection state, in addition to a case in which the member A and the member C or the member B and the member C are directly connected.

Figure 3:
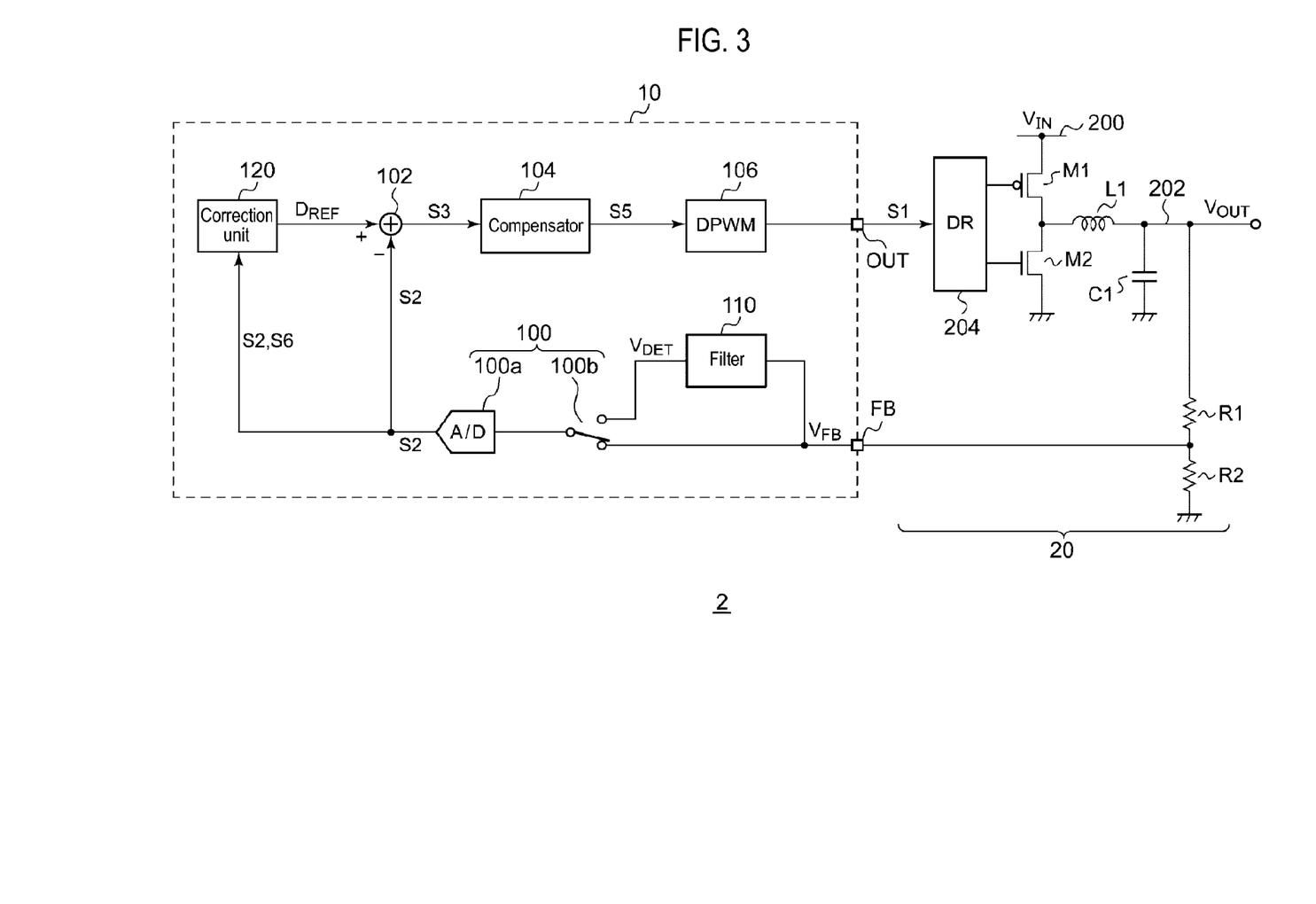
FIG. 3 is a circuit diagram of a power supply circuit according to an embodiment of the present disclosure.

FIG. 3 is a circuit diagram of a power supply circuit 2 according to an embodiment of the present disclosure. The power supply circuit 2 includes a control circuit 10 and an output circuit 20.

The output circuit 20 includes some circuit elements and wiring, which exist outside of the control circuit 10. The output circuit 20 has at least a switching transistor M1, an inductor L1, and an output line 202. FIG. 3 illustrates an output circuit of a step-down DC/DC converter, which includes a synchronous rectification transistor M2, an output capacitor C1, and a driver 204. The driver 204 complementarily switches the switching transistor M1 and the synchronous rectification transistor M2 depending on a pulse signal S1 from an output terminal OUT of the control circuit 10 to step down an input voltage $V_{IN}$ of the input line 200 to thereby generate a DC output voltage $V_{OUT}$ stabilized with a predetermined level in the output line 202. When the pulse signal S1 has a high level, the driver 204 turns on the switching transistor M1 and turns off the synchronous rectification transistor M2, and when the pulse signal S1 has a low level, the driver 204 turns off the switching transistor M1 and turns on the synchronous rectification transistor M2.

Further, the topology of the output circuit 20 is not particularly limited and the output circuit 20 may be a step-up (or boost) converter, a buck-boost converter, or a voltage inversion converter. The output circuit 20 may be a converter using a transformer, instead of an inductor.

The control circuit 10 includes an A/D converter 100, an error detector 102, a compensator 104, a digital pulse modulator 106, a first filter 110 and a correction unit 120 and is a functional integrated circuit (IC) integrated on a single semiconductor substrate. The control circuit 10 may be a part of a general microcomputer or may be an application specific IC (ASIC) designed for an exclusive use. Further, each block illustrated in FIG. 3 and other drawings may be configured as a dedicated hardware or may be configured by a processor that executes a software program.

The first filter 110 smoothes the output voltage $V_{OUT}$ of the power supply circuit 2, and generates a detection voltage $V_{DET}$ having a voltage level depending on a time average of the output voltage $V_{OUT}$. The detection voltage $V_{DET}$ is obtained by the following equation using the average voltage $V_{OUT\_AVE}$ of the output voltage $V_{OUT}$.

$$V_{DET}=V_{OUT\_AVE} \times R2/(R1+R2)$$

The A/D converter 100 (i) samples the feedback voltage $V_{FB}$ having a voltage level depending on the output voltage $V_{OUT}$ of the digital control power supply circuit at a peak or bottom of the output voltage $V_{OUT}$ and converts the sampled feedback voltage into digital feedback data S2. For example, the feedback voltage $V_{FB}$ is a voltage obtained by dividing the output voltage $V_{OUT}$ by resistance dividing circuits R1 and R2 of the output circuit 20. Further, the A/D converter 100 (ii) converts the detection voltage $V_{DET}$ into digital detection data S6.

The A/D converter 100 performs the (i) and (ii) functions in a time-division manner. The A/D converter 100 includes a conversion unit 100a and a selector 100b installed in the front end thereof. The selector 100b receives the detection voltage $V_{DET}$ and the feedback voltage $V_{FB}$ and selects one of them. The conversion unit 100a analog-to-digital converts the voltage selected by the selector 100b. Thus, two voltages can be converted into digital data by using the single conversion unit 100a, saving hardware resources.

Alternatively, the A/D converter 100 may include a conversion unit which converts the detection voltage $V_{DET}$ into detection data and a conversion unit which converts the feedback voltage $V_{FB}$ into feedback data. In this case, the A/D converter 100 may perform the (i) and (ii) functions simultaneously in parallel.

The A/D converter 100 obtains the feedback voltage $V_{FB}$ at every period (switching period) $T_{SW}$ of the pulse signal S1, and updates it. Meanwhile, the A/D converter 100 obtains the detection voltage $V_{DET}$ at every period (update period $T_{UD}$) longer than the switching period $T_{SW}$, and updates the detection data S6 at every update period $T_{UD}$. The update period $T_{UD}$ may follow fluctuations of the ripple voltage $V_{RIP}$, and thus, the update period $T_{UD}$ is longer, in some embodiments, than the switching period $T_{SW}$. For example, the ESR of the output capacitor C1 fluctuates in a time scale such as a month or a year. Thus, the update period $T_{UD}$ may be set in the hundreds of ms to a few seconds, e.g., one second, sufficiently longer than the switching period $T_{SW}$.

The error detector 102 generates error data S3 which indicates a difference between the feedback data S2 and target data $D_{REF}$ indicating a target value of the feedback voltage $V_{FB}$. The compensator 104 generates a duty command value S5 which is adjusted to approximate the error data S3 to zero. An operation processed by the compensator 104 is not particularly limited, but, for example, the compensator 104 may perform PID control. Alternatively, PI control or the like may be performed by the compensator 104 in some cases.

The digital pulse modulator 106 receives the duty command value S5 and generates a pulse signal S1 having a duty ratio D corresponding to the duty command value S5. In this embodiment, the digital pulse modulator 106 performs a pulse width modulation (PWM). The pulse signal S1 has a predetermined period (hereinafter, referred to as a switching period) Tp. A high level section thereof is referred to as an ON time $T_{ON}$, and a low level section thereof is referred to as an OFF time $T_{OFF}$.

$$T_{ON}=D \times Tp$$

$$T_{OFF}=(1-D) \times Tp$$

For example, the digital pulse modulator 106 may include a free run counter and a digital comparator. The free run counter generates a carrier having a value which transitions periodically. The digital comparator allows the pulse signal S1 to transition at a crossing point between the value of the carrier and the duty command value S5. Also, the configuration of the digital pulse modulator 106 is not particularly limited and any kind of known techniques may be used.

A difference between the detection data S6 and the feedback data S2 is input to the correction unit 120. The correction unit 120 corrects the target data $D_{REF}$ based on the difference.

The basic configuration of the control circuit 10 has been described above. The scope of the present disclosure may cover various circuits recognized by the block diagram of FIG. 3, but one of the various circuits will be described hereinafter.

Figure 4:
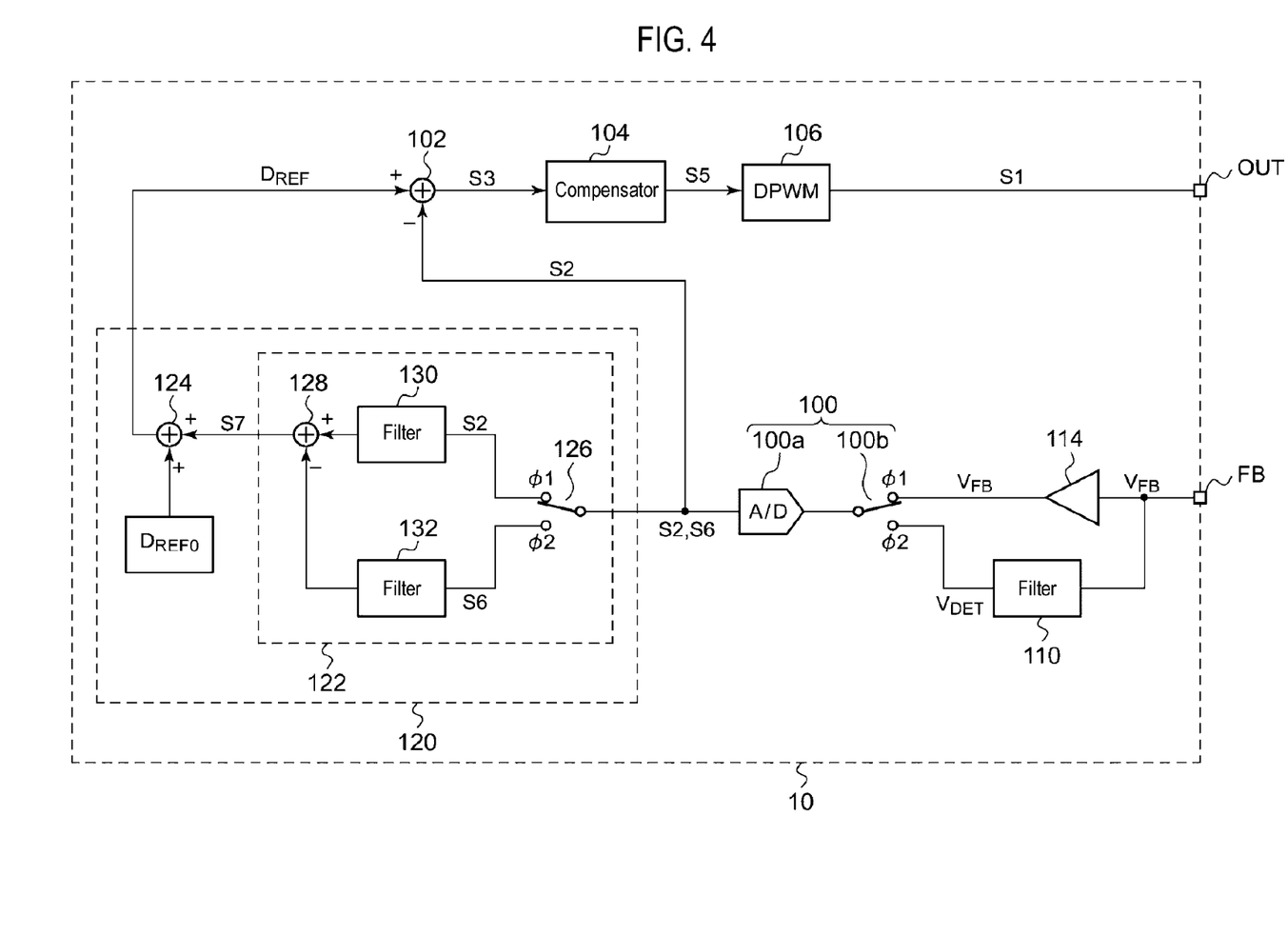
FIG. 4 is a block diagram illustrating a detailed configuration example of the control circuit of FIG. 3.

FIG. 4 is a block diagram illustrating a detailed configuration example of the control circuit 10 of FIG. 3. The buffer 114 receives the feedback voltage $V_{FB}$ and outputs the same to the A/D converter 100. When input impedance of the A/D converter 100 is sufficiently high, the buffer 114 may be omitted.

The first filter 110 may be configured, for example, as a low pass filter using an active element, namely, i.e., as an active low pass filter. Alternatively, the first filter 110 may be a passive filter. A cutoff frequency of the first filter 110 is set to be lower than the frequency (switching frequency) of the pulse signal S1 such that ripples overlapping on the feedback voltage $V_{FB}$ can be removed.

Further, when output impedance of the first filter 110 is high, a buffer may be inserted into an output terminal of the first filter 110.

The correction unit 120 includes a differential data generating unit 122 and an adder 124. The differential data generating unit 122 generates difference data S7 indicating a difference between the detection data S6 and the feedback data S2. The differential data generating unit 122 includes a selector 126, a subtractor 128, a second filter 130, and a third filter 132. When the feedback data S2 is output from the A/D converter 100 (Φ1), the selector 126 outputs the feedback data S2 to the second filter 130. Further, when the detection data S6 is output from the A/D converter 100 (Φ2), the selector 126 outputs the detection data S6 to the third filter 132. The second filter 130 calculates a time average of the feedback data S2, and the third filter 132 calculates a time average of the detection data S6. An influence of noise can be removed by the second filter 130 and the third filter 132, and thus, stable control can be achieved.

The subtractor 128 subtracts the detection data S6 from the feedback data S2 to generate difference data S7. The difference data S7 indicates ½ of a ripple amplitude $V_{RIP}$ of the output voltage $V_{OUT}$.

The adder 124 adds the difference data S7 to the set value (integer) $D_{REF0}$ of the target data to generate target data $D_{REF}$. A target voltage $V_{REF}$ indicated by the generated target data $D_{REF}$ is expressed by Eq. (3) below:

$$V_{REF} = V_{REF0} + (V_{FB} - V_{DET}) = V_{REF0} + V_{RIP}/2 \qquad \text{Eq. (3)}$$

The control circuit 10 controls the output circuit 20 such that the feedback data S2 approximates the target data $D_{REF}$, namely, i.e., such that the feedback voltage $V_{FB}$ approximates the reference voltage $V_{REF}$.

The configuration of the power supply circuit 2 has been described above. Subsequently, an operation thereof will be described.

Figure 5:
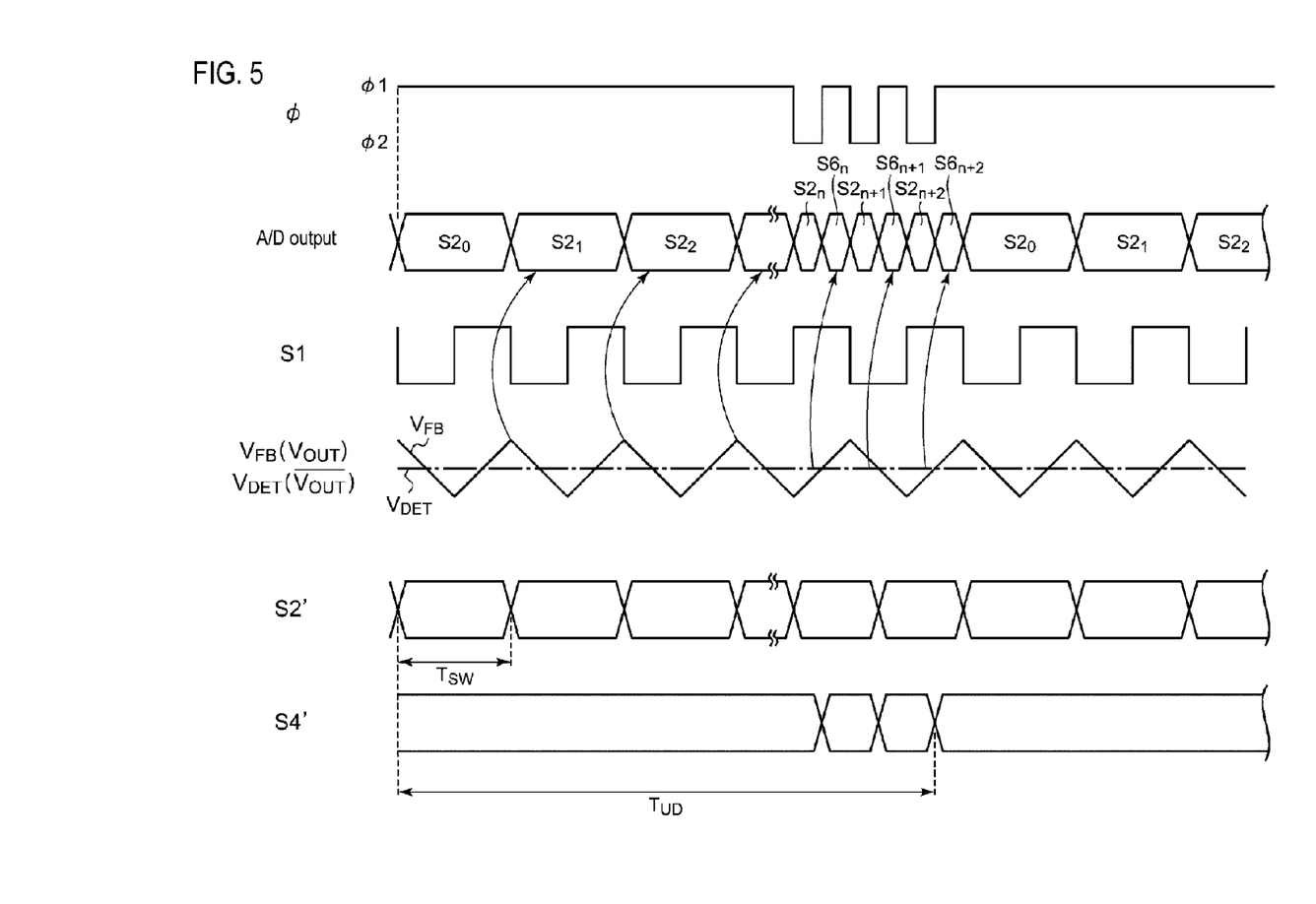
FIG. 5 is an operational waveform diagram of the control circuit of FIG. 4.

FIG. 5 is an operational waveform view of the control circuit 10 of FIG. 4.

The feedback voltage $V_{FB}$ is converted into the digital feedback data S2 at every peak of the output voltage $V_{OUT}$. Further, the detection voltage $V_{DET}$ indicating an average level of the output voltage $V_{OUT}$ is obtained at least once or several times at every update period $T_{UD}$ and converted into the detection data S6. And, the difference data S7 is generated depending on the data S2 and S6 moving-averaged by the second filter 130 and the third filter 132, to correct the target data $D_{REF}$.

Figure 6:
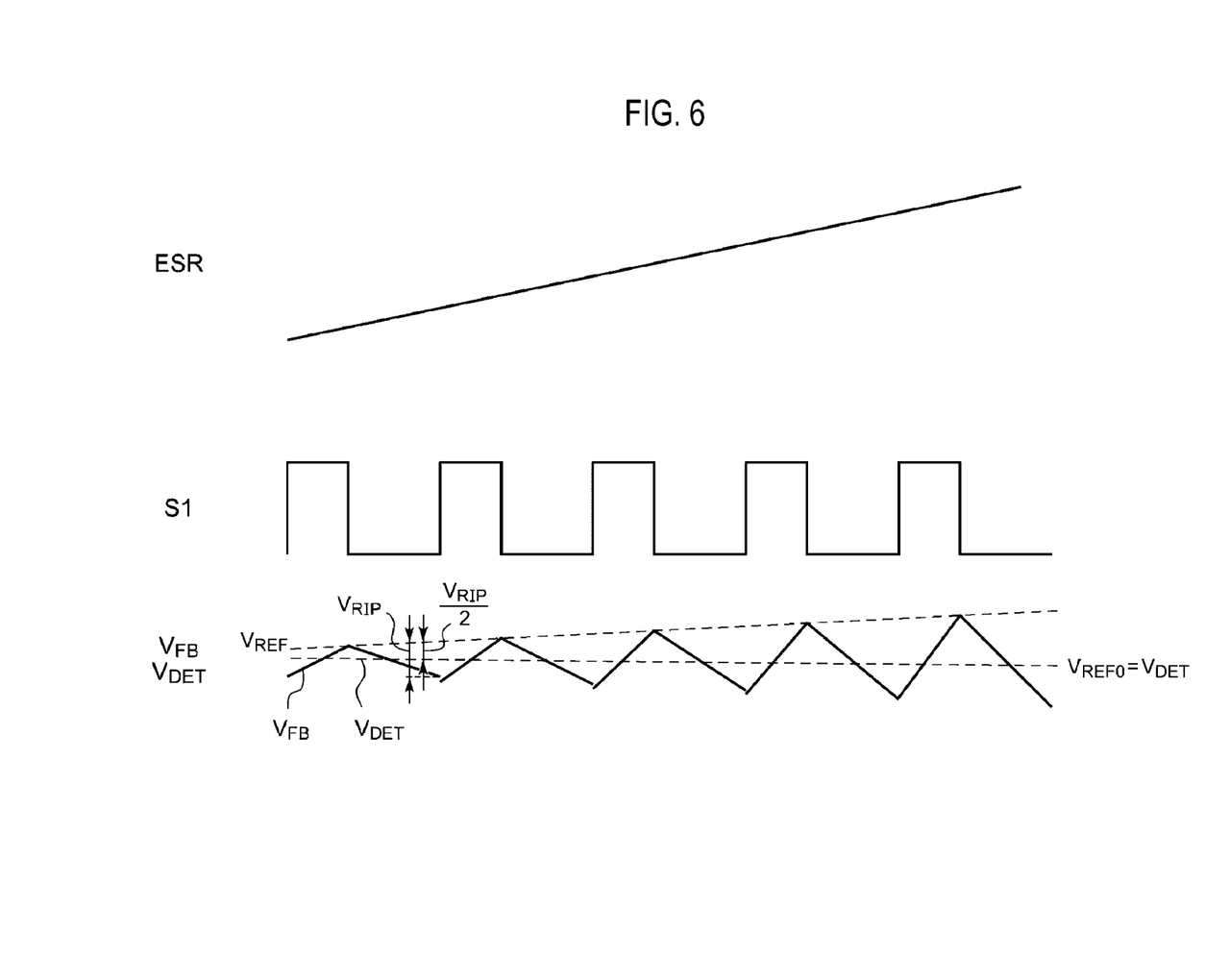
FIG. 6 is an operational waveform diagram of the entire power supply circuit of FIG. 3.

FIG. 6 is an operational waveform view of the entire power supply circuit 2 of FIG. 3.

When the ESR increases, the ripple voltage $V_{RIP}$ increases proportionally. In the power supply circuit 2, the reference voltage $V_{REF}$ is changed to follow the ripple voltage $V_{RIP}$ depending on Eq. (3) above. The power supply circuit 2 is feedback controlled such that a peak level $V_{FB\_PEAK}$ of the feedback voltage $V_{FB}$ becomes equal to the reference voltage $V_{REF}$ of Eq. (3), namely, such that Eq. (4) is established.

$$V_{FB\_PEAK} = V_{REF} = V_{REF0} + V_{RIP}/2 \qquad \text{Eq. (4)}$$

An average voltage $V_{FB\_AVE}$ of the feedback voltage V (actual output voltage $V_{OUT}$) is supplied to a load connected to the output line 202. A relationship of Eq. (5) is established between the peak $V_{FB\_PEAK}$ of the feedback voltage and the average $V_{FB\_AVE}$.

$$V_{FB\_PEAK} = V_{FB\_AVE} + V_{RIP}/2 \qquad \text{Eq. (5)}$$

When Eqs. (4) and (5) are compared, it can be seen that the feedback applied to establish Eq. (4) is equivalent to the feedback applied to make $V_{FB\_AVE}$ approximate to $V_{REF0}$.

Here, the target voltage $V_{REF0}$ is an integer which does not follow the ESR and time. Thus, according to the power supply circuit 2, even though the ripple voltage $V_{RIP}$ of the output voltage $V_{OUT}$ is changed, the average value of the output voltage $V_{OUT}$ can be stabilized to the voltage level ($V_{REF} \times (R1+R2)/R2$) depending on the predetermined target voltage $V_{REF0}$.

The present disclosure has been described above based on the embodiment. The present embodiment is merely illustrative and it will be understood by a person skilled in the art that combinations of respective components and processes may be variably modified and such modifications are also within the scope of the present disclosure. Hereinafter, some of these modifications will be described.

First Modification

Figure 7:
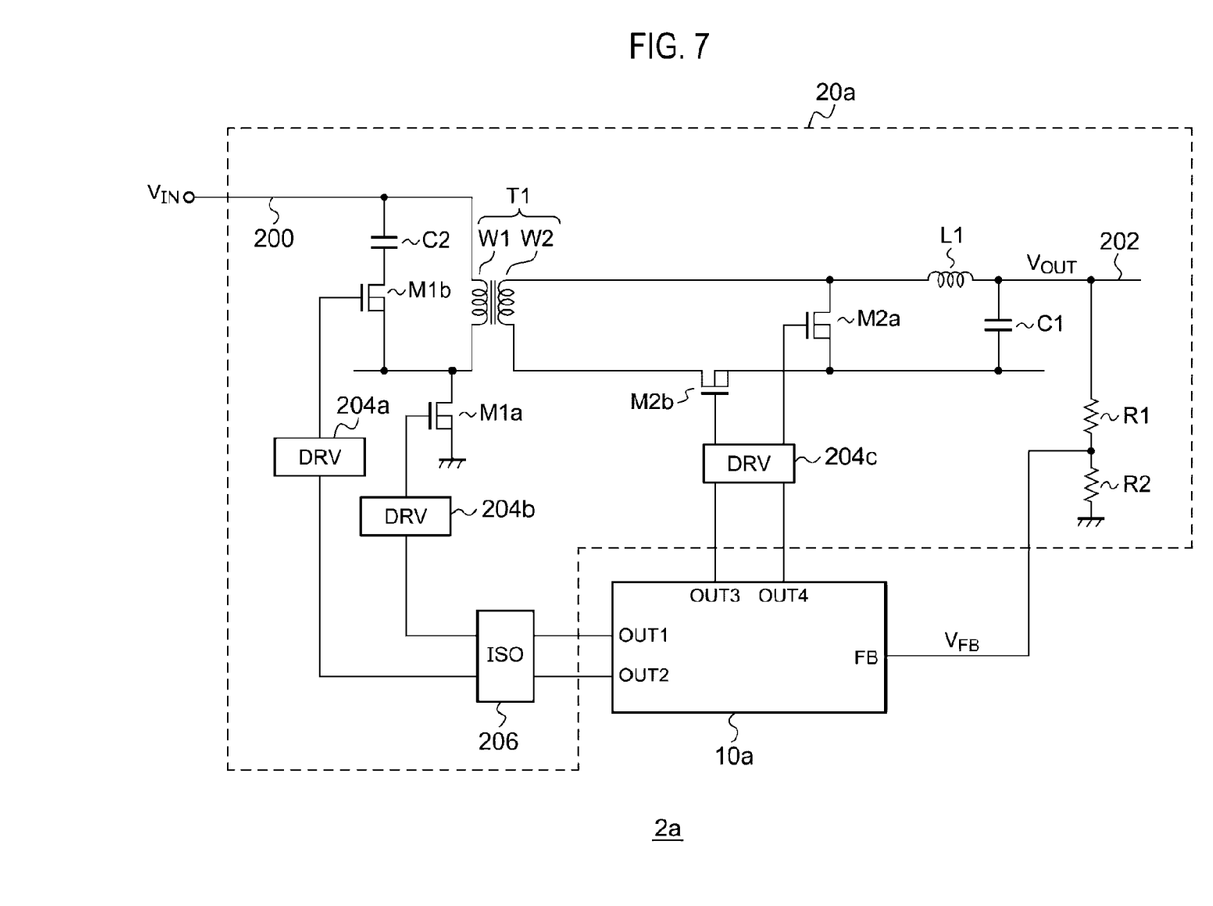
FIG. 7 is a circuit diagram of a power supply circuit according to a first modification.

Although the step-down converter has been described in the above embodiment, the present disclosure is not limited thereto. FIG. 7 is a circuit diagram of a power supply circuit 2a according to a first modification. The power supply circuit 2a of FIG. 7 is a so-called active clamp type forward converter. An output circuit 20a is divided into a primary side and a secondary side by a transformer T1. In the primary side, a primary winding W1 of the transformer T1, a switching transistor M1a connected to the primary winding W1, an auxiliary transistor M1b, a clamp capacitor C2, and drivers 204a and 204b are installed. For use in a case where the primary side and the secondary side of the transformer T1 need to be insulated from each other, an isolator 206 is added.

In the secondary side, a secondary winding W2 of the transformer T1, rectification transistors M2a and M2b connected to the secondary winding W2, a capacitor C1, an inductor L1, and a driver 204c are installed. Resistors R1 and R2 are configured to voltage-divide an output voltage $V_{OUT}$ to generate a feedback voltage $V_{FB}$.

The control circuit 10a generates a pulse signal S1 based on the feedback voltage $V_{FB}$ input to a feedback terminal FB thereof, and drives the transistors M1a, M1b, M2a, and M2b by using the pulse signal S1 and pulse signals derived therefrom.

The present disclosure is also applicable to an active clamp type forward converter. In addition, the present disclosure is also applicable to a general forward converter. The present disclosure may also be applicable in a topology in which the rectification transistors M2a and M2b of the secondary side are substituted with diodes.

Further, the present disclosure is also applicable to a flyback converter, a half-bridge type converter, or a full-bridge type converter, as well as to the forward converter. It may be understood by a person skilled in the art that the present disclosure is applicable without being limited to the topology of the particular output circuit 20.

Second Modification

Although the case in which the feedback voltage $V_{FB}$ is sampled at the timing of the peak of the output voltage $V_{OUT}$ and the peak of the feedback voltage $V_{FB}$ is controlled to become equal to the target voltage $V_{REF}$ has been described in the above embodiment, the present disclosure is not limited thereto. In a second modification, the control circuit 10 performs a feedback control such that the bottom $V_{FB\_BOT}$ of the feedback voltage $V_{FB}$ becomes equal to the reference voltage $V_{REF}$. In this case, the A/D converter 100 samples the feedback voltage $V_{FB}$ at the timing of the bottom of the output voltage $V_{OUT}$ to generate the feedback data S2. The correction unit 120 corrects the reference voltage $V_{REF}$ depending on Eq. (3').

$$D_{REF} = D_{REF0} - (S2 - S6)$$

$$V_{REF} = V_{REF0} - (V_{FB} - V_{DET}) = V_{REF0} - V_{RIP}/2 \qquad \text{Eq. (3')}$$

Third Modification

Although the case in which the fluctuation of the output voltage $V_{OUT}$ depending on a change in ESR is suppressed has been described in the above embodiment, the present disclosure is not limited thereto. For example, when the input voltage $V_{IN}$ is changed, the ripple voltage $V_{RIP}$ may be changed and an average level of the output voltage $V_{OUT}$ may be fluctuated. According to the present disclosure, the fluctuation of the output voltage $V_{OUT}$ depending on the fluctuation of the input voltage $V_{IN}$ may also be suppressed. In this case, in order to follow the fluctuation of the input voltage, the update period $T_{UD}$ of the detection voltage $V_{DET}$ may be shortened so that the update frequency may be increased.

Fourth Modification

In the above embodiment, it has been described that the digital pulse modulator 106 performs voltage mode pulse width modulation, but the modulation scheme is not particularly limited. The present disclosure is also applicable for a control circuit including a modulation scheme other than the pulse width modulation, for example, a peak current mode and average current mode modulator.

Fifth Modification

In the above embodiment, the average level of the output voltage $V_{OUT}$ (feedback voltage $V_{FB}$) is detected by the first filter 110 and the ripple voltage $V_{RIP}/2$ is detected based on the difference between the peak (or bottom) of the output voltage $V_{OUT}$ (feedback voltage $V_{FB}$) and the average level, but the present disclosure is not limited thereto. For example, instead of using the first filter 110, in the A/D converter 100, one of the peak and the bottom of the feedback voltage $V_{FB}$ may be used as the feedback data S2 and the other may be used as the detection data S6. In this case, the ripple voltage $V_{RIP}$ may be detected by calculating a difference between the feedback data S2 and the detection data S6. In this case, the reference data $D_{REF}$ may be corrected depending on Eq. (4).

$$D_{REF} = D_{REF0} + (S2 - S6)/2 \text{ (where S2 is the peak of feedback voltage)}$$

$$D_{REF} = D_{REF0} - (S2 - S6)/2 \text{ (where S2 is the bottom of feedback voltage)}$$

(Uses of Power Supply Circuit)

Figure 8A:
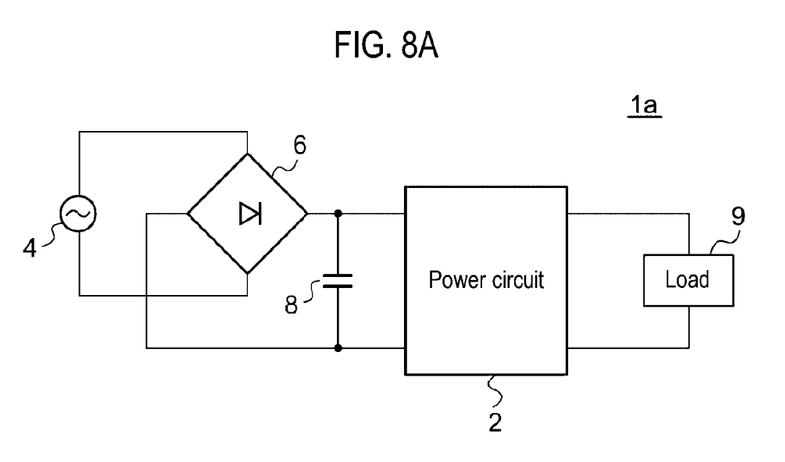
FIGS. 8A and 8B are block diagrams illustrating electronic devices including a power supply circuit.
Figure 8B:
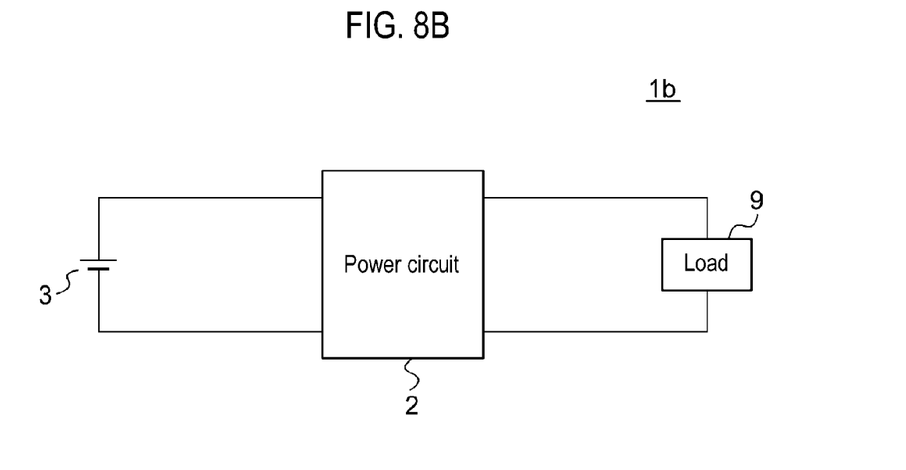

Finally, uses of the power supply circuit 2 will be described. FIGS. 8A and 8B are block diagrams illustrating electronic devices having the power supply circuit 2. An electronic device 1a of FIG. 8A includes a bridge circuit 6 that rectifies an AC voltage from a commercial AC power source 4, a smoothing capacitor 8, the power supply circuit 2 described above, and a load 9. In this case, as the power supply circuit 2, a non-insulating step-down, step-up, buck-boost converter or the like may be appropriately used. The electronic device 1a may be, for example, a base station for a mobile communication, home appliances such as a TV, a PC, or a refrigerator, office automation devices such as a facsimile or a copier, machine tools, or the like.

An electronic device 1b of FIG. 8B includes a battery 3, the power supply circuit 2 described above that receives a voltage from the battery 3, and a load 9. The electronic device 1b may be, for example, a portable phone terminal, a tablet PC, a digital camera, a digital video camera, or the like. For example, the load 9 may be a microcomputer and a memory, a liquid crystal driver and an LED for a liquid crystal backlight, or an LED for a camera flash.

According to the present disclosure in some embodiments, it is possible to improve stability of an output voltage.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a digital control power supply circuit, comprising:
   a first filter configured to generate a detection voltage having a voltage level based on a time average of an output voltage of the digital control power supply circuit;
   an A/D converter configured to (i) sample a feedback voltage having a voltage level based on the output voltage of the digital control power supply circuit at a peak or a bottom of the output voltage and convert a sampled feedback voltage into digital feedback data, and (ii) convert the detection voltage into digital detection data;
   an error detector configured to generate error data indicating a difference between the digital feedback data and target data indicating a target value of the feedback voltage;
   a compensator configured to generate a duty command value adjusted to make the error data approximate zero;
   a digital pulse modulator configured to receive the duty command value and generate a pulse signal having a duty ratio corresponding to the duty command value; and
   a correction unit configured to correct the target data based on a difference between the digital detection data and the digital feedback data.

2. The control circuit of claim 1, wherein the correction unit comprises:
   a differential data generating unit configured to generate difference data indicating the difference between the digital detection data and the digital feedback data; and
   an adder configured to add the difference data to a set value of the target data.

3. The control circuit of claim 2, wherein the correction unit further comprises:
   a second filter configured to calculate a time average of the digital feedback data; and
   a third filter configured to calculate a time average of the digital detection data.

4. The control circuit of claim 1, wherein the A/D converter is configured to update the digital detection data at a period longer than a period of the pulse signal.

5. The control circuit of claim 1, wherein the compensator is configured to perform a proportional, integral and derivative (PID) control.

6. The control circuit of claim 1, wherein the control circuit is integrally integrated on a single semiconductor substrate.

7. A digital control power supply circuit, comprising:
an output circuit having at least a switching transistor, an inductive element, and an output line configured to generate a DC output voltage based on a switching operation of the switching transistor; and
the control circuit of claim 1, configured to control the switching transistor based on the output voltage.

8. An electronic device comprising the digital control power supply circuit of claim 7.

9. A base station for mobile communication comprising the digital control power supply circuit of claim 7.

10. A control method of a digital control power supply circuit, comprising:
generating a detection voltage having a voltage level obtained by smoothing an output voltage of the digital control power supply circuit;
sampling a feedback voltage having a voltage level based on the output voltage of the digital control power supply circuit at a peak or a bottom of the output voltage and converting the sampled feedback voltage into digital feedback data;
converting the detection voltage into digital detection data;
generating error data indicating a difference between the digital feedback data and target data indicating a target value of the feedback voltage;
generating a duty command value adjusted to make the error data approximate zero;
generating a pulse signal having a duty ratio corresponding to the duty command value; and
correcting the target data based on a difference between the digital detection data and the digital feedback data.

* * * * *